United States Patent [19]
Wright et al.

[11] Patent Number: 5,918,074
[45] Date of Patent: Jun. 29, 1999

[54] SYSTEM ARCHITECTURE FOR AND METHOD OF DUAL PATH DATA PROCESSING AND MANAGEMENT OF PACKETS AND/OR CELLS AND THE LIKE

[75] Inventors: Tim Wright, Framingham; Peter Marconi; Richard Conlin, both of Franklin; Zbigniew Opalka, Harvard, all of Mass.

[73] Assignee: NeoNet LLC, Marlborough, Mass.

[21] Appl. No.: 08/900,757

[22] Filed: Jul. 25, 1997

[51] Int. Cl.[6] .................................................. G06F 13/00

[52] U.S. Cl. .................... 395/872; 395/822; 395/200.43; 395/840; 395/849; 370/389; 370/395

[58] Field of Search ........................... 395/200.41–200.46, 395/822–827, 840–841, 847–858, 872–876; 370/389–396

[56] References Cited

U.S. PATENT DOCUMENTS

| | | | |
|---|---|---|---|
| 5,313,582 | 5/1994 | Hendel et al. | 395/876 |
| 5,610,914 | 3/1997 | Yamada | 370/395 |
| 5,715,407 | 2/1998 | Barth et al. | 395/290 |
| 5,752,078 | 5/1998 | Delp et al. | 395/827 |
| 5,799,209 | 8/1998 | Chatter | 395/876 |

*Primary Examiner*—Christopher B. Shin
*Attorney, Agent, or Firm*—Rines & Rines

[57] ABSTRACT

A novel networking architecture and technique for reducing system latency caused, at least in part, by access contention for usage of common bus and memory facilities, wherein a separate data processing and queue management forwarding engine and queue manager are provided for each I/O module to process packet/cell control information and delivers queuing along a separate path that eliminates contention with other resources and is separate from the transfer of packet/cell data into and from the memory.

20 Claims, 7 Drawing Sheets

SYSTEM ARCHITECTURE FOR AND METHOD OF DUAL PATH DATA PROCESSING AND MANAGEMENT OF PACKETS AND/OR CELLS AND THE LIKE

The present invention relates to networking systems and the forwarding and routing of information therein, being more particularly directed to the problems of the latency of a system occasioned by contention for access to shared memory and by the time taken to make forwarding and/or routing decisions—the invention being directed, among other factors, to minimizing such latency.

BACKGROUND OF INVENTION

Two of the primary factors and concerns driving the system performance in networking systems generally are bandwidth capability and system operational latency. Bandwidth reflects the amount of data that can be transferred through the system; and latency involves the amount of time that data "stays" within the system.

The present invention is concerned with minimizing latency. In co-pending U.S. patent application Ser. No. 581,467, filed Dec. 29, 1995 now U.S. Pat. No. 5,799,209, for High Performance Universal Multi-Port Internally Cached Dynamic Random Access Memory System, Architecture and Method, of common assignee herewith, a promising solution of maximizing bandwidth is provided.

Latency of a network system is determined by several factors, a primary one being the amount of time it takes to make a forwarding or routing decision as a result of examining the control information at the beginning of a data packet or cell. The control information is different depending upon whether a cell or a packet is involved. For a cell, a switching decision is made based upon the VCI/VPI information which can be used to map the cell to an egress interface within the system. For a packet, on the other hand, a routing decision is made based upon the destination address which can be used to map the packet to an egress interface. For a packet, furthermore, the source address can also be used to provide a level of filtering based on source and destination address pairs in which a number of rules are set up to define which source/destination pairs are allowed to communicate. If a packet is received that does not adhere to such rules, then it is dropped. Typically, for example, the data is either 53 bytes for cells or 64 to 64K bytes for packets in networks of this character.

In traditional systems, the processing of control information is done by a Central Processing Unit (CPU) and can not begin until the entire cell/packet is received. The latency of such a system is dependent upon the transfer of data from an I/O port into memory, the accessing of the control information located at the beginning of the data, the updating of that control information, and the transfer of data from memory to an I/O port. All of these accesses to the shared memory result in substantial bus and memory contention, which increases the latency. The latency is large in this kind of architecture because the processing of the control information cannot begin until the entire packet/cell is received. Other items that result in increasing latency include supporting Quality of Service (QOS) and multicast. QOS requires maintaining multiple queues for each I/O port, thereby increasing the number of accesses to an already overworked memory. Multicast requires sending the same packet/cell to multiple I/O ports, and again, this increases the number of accesses to an overworked memory.

Still another factor in the determining of the latency of a system is the throughput of the shared memory. If the throughput of the shared memory is not very high, then the latency is increased accordingly. In general, to support full bandwidth, the memory throughput needs to be equal to two times the port speed times the number of ports. This, however, does not account for all the other accesses that must be performed to the same shared memory, thereby requiring the memory throughput to be even higher to minimize latency and to achieve high bandwidth through the system. As more ports are added and the speed of each port is increased, moreover, the latency is increased proportionally. Increasing the throughput of the shared memory system therefore becomes a very difficult problem.

As will subsequently be demonstrated, most conventional networking systems operations inherently forbid attaining zero or near-zero latency. In accordance with the present invention, on the other hand, through use of a novel dual path data processing and management of packet/cell architecture, optimally minimized latency can at last be achieved.

OBJECTS OF INVENTION

An object of the present invention, accordingly, is to provide such a novel system architecture for and method of dual path data processing and management of data packets and/or cells and the like that dramatically reduces latency.

A further object is to achieve this new result of minimizing latency without contending with other resources while processing the control information of each packet/cell.

Other and further objects will be explained hereinafter and are more particularly delineated in the appended claims.

SUMMARY

In summary, from one of its important view points, the invention encompasses in a CPU or data controller system, wherein data is interfaced along a common bus connected with common memory and with a plurality of I/O modules receiving and writing into the memory and removing therefrom packets/cells of data, a method of reducing memory access contention and resulting system latency, that comprises, providing each I/O module with a corresponding forwarding engine and transmit queue facility and a separate path for extracting control information from the packet/cell received by that I/O module and providing that control information to the forwarding engine; processing the extracted packet/cell control information in the forwarding engine for making switching, routing and/or filtering decisions while the data thereof is being written into the memory, passing the results of the forwarding engine processing to a queue manager for enqueuing and dequeuing receive and transmit queues of each packet/cell, and controlling, through the corresponding I/O module transmit queue facility, the interfacing with the appropriate egress I/O module to which to transmit the packet/cell data, all without contention with and independent of the transfer of packet/cell data into and from the memory.

Preferred and best mode designs and techniques are hereinafter presented in detail.

DRAWINGS

The invention will now be explained in connection with the accompanying drawings in which FIG. 1 is a block diagram of an exemplary packet/cell structure of prior art and current networking systems;

THE LATENCY LIMITATIONS IN PRIOR ART AND CURRENT NETWORK SYSTEMS

Figure 1:
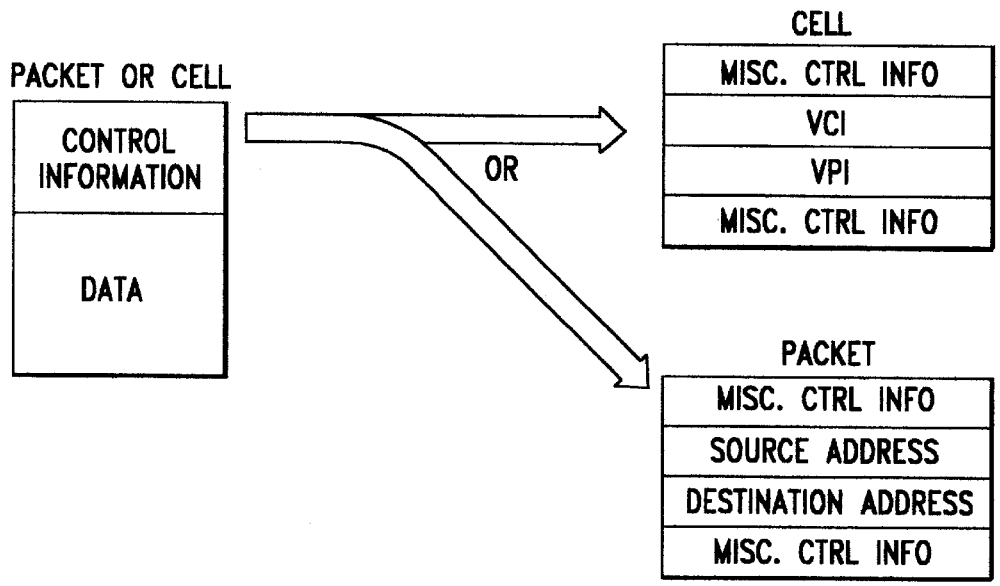

As before explained, in a typical packet/cell configuration for use with network systems, the control information is located at the beginning of the packet or cell as schematically shown in FIG. 1. The switching decision for cells is there shown based upon VCI/VPI information, used to map the cell to an egress interface within the system as earlier mentioned. The routing decision for a packet is based upon the destination address, used to map the packet to an egress interface.

Figure 2:
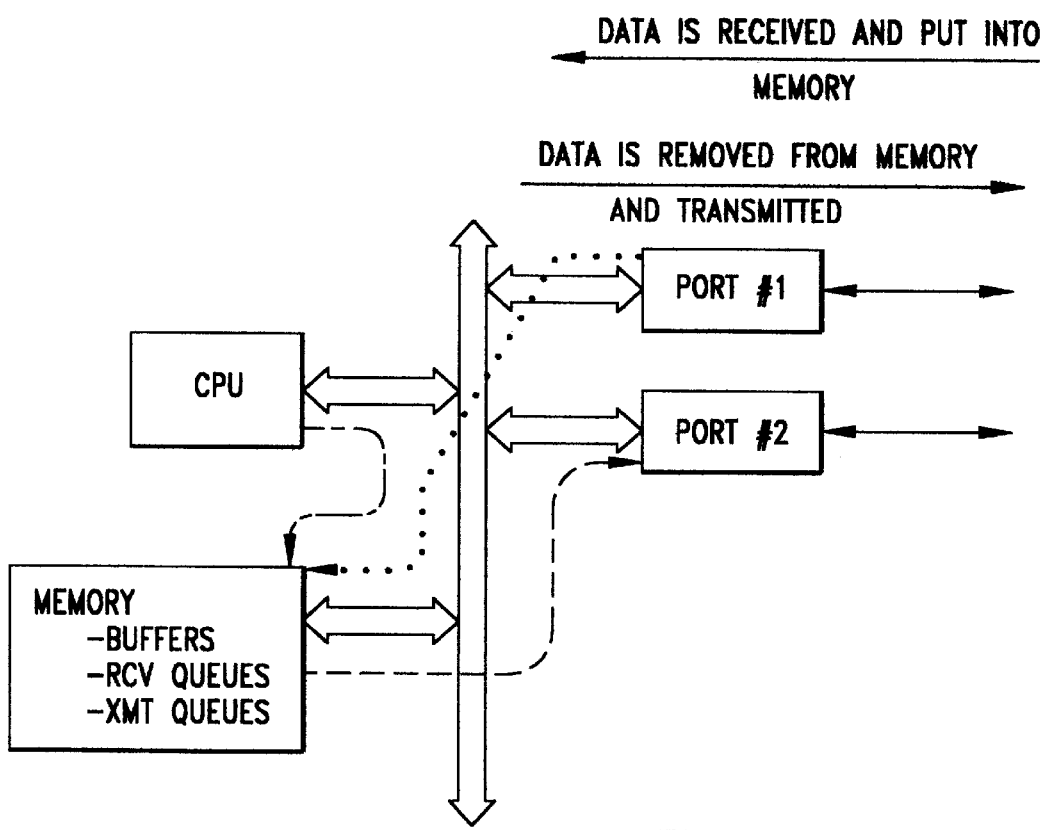
FIG. 2 is a similar diagram of an illustrative typical prior art system in networking.

In the traditional system of FIG. 2, a CPU interfaces through a common bus, with memory access, with a plurality of data-receiving and removing I/O ports #1, #2, etc., with the various dotted and dashed lines showing the interfacing paths and the shared memory, as is well known. As before pointed out, the various accesses of the shared memory result in substantial contention, increasing the latency, which is already substantial in this kind of architecture because the processing of the control information cannot begin until the entire packet/cell is received.

Figure 3:
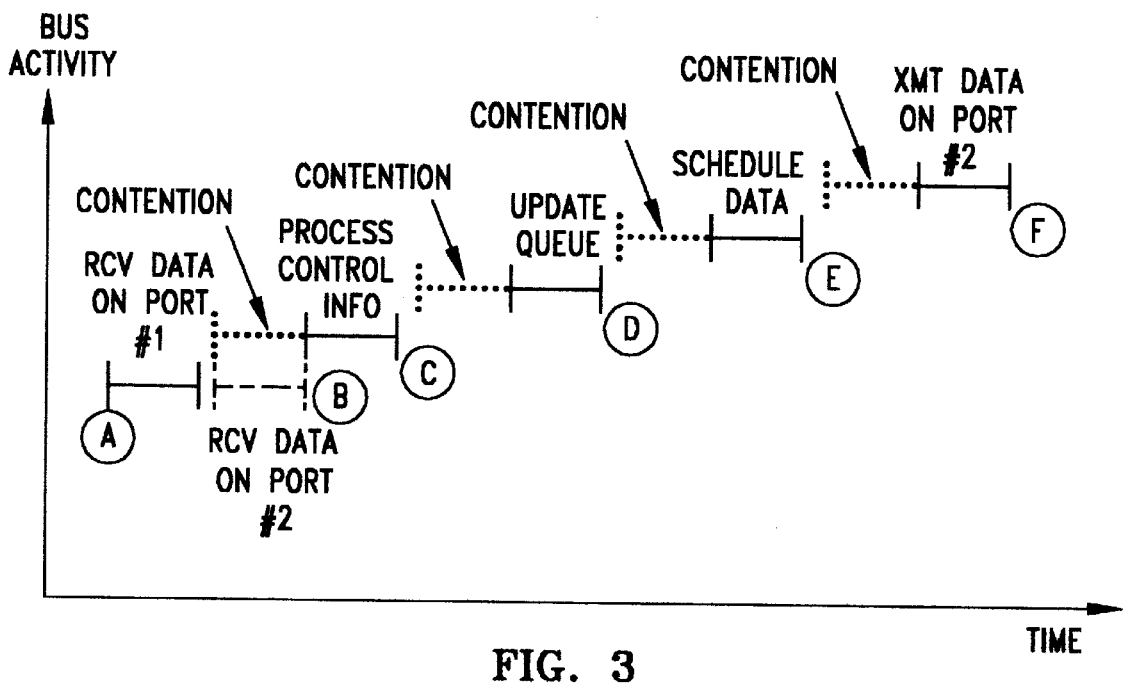
FIG. 3 is a diagram showing how contention results in creating latency.

As can be seen from FIG. 3, furthermore, as the accesses to the shared memory are increased, so is the contention; and as the contention is increased, this results in increasing the latency of the system. In FIG. 3, (where the access time per read or write to the memory is equal to M, and the number of bits for a memory access is W), the following functions are shown:

A. Write of data from the receive port #1 to shared memory. The time to transfer a packet or cell is equal to $((B*8)/W)*M$, where B is equal to the number of bytes for the packet or cell. As the packet gets larger so does the time to write it to memory.

B. Write of data from the receive port #2 to shared memory. The time to transfer a packet or cell is equal to $((B*8)/W)*M$, where B is equal to the number of bytes for the packet or cell. As the packet gets larger so does the time to write it to memory.

C. Read of the control information from the packet/cell just written to shared memory from port #1. The amount of time this takes depends upon the amount of control information to be read. This is typically around 24 to 28 bytes for packets and five bytes for cells. The number of bytes to read is equal to N; therefore the read time is $((N*8)/W)*M$. As can be seen, since other interfaces are contending for the same shared memory, this access takes longer because port #2 is currently writing data into memory. This increases the latency of the packet/cell that was just received on port #1.

D. Write buffer address of packet/cell just received from port #1 onto appropriate queue. This is typically, eight to 12 bytes. The time to update the queue is $((P*8)/W)*M$, where P is the length of the queue information to be written into the appropriate queue. Since other interfaces may be contending for the same shared memory, this access takes longer, again increasing the latency of the packet/cell that was just received on port #1.

E. This is reading the different queues to determine which queues have data that is available to be transmitted. This would consist of reading multiple queues until the buffer address of the packet/cell from port #1 is ready to be transmitted. Each queue entry read is, typically, eight to 12 bytes. The time to update the queue is $(Q+1)(((P*8)/W)*M)$, where Q is the number of queues read before the packet is finally dequeued. Again, since other interfaces may be contending for the same shared memory, this access takes longer, once more increasing the latency of the packet/cell that was just received on port #1.

F. Read of data from the shared memory to receive port #2. The time to transfer a packet or cell is equal to $((B*8)/W)*M$, where B is equal to the number of bytes for the packet or cell. As the packet gets larger so does the time to read it from memory.

The goal of a system is, of course, to achieve zero (or near zero) latency. Having zero latency would result in having no time between writing a packet/cell into memory from the ingress interface and reading it out of memory for the egress interface. In fact, a race condition could exist if the egress interface could be determined and the buffer address dequeued before the packet/cell was completely written into memory. The race condition would result in starting to read out the data before it has been completely written into memory, thereby transmitting incorrect data. In the shared memory system, as before explained, it is impossible to achieve zero latency since the processing of the control information and queuing cannot begin until the packet/cell is completely written into memory.

Typical systems today will try to decrease latency in the system by providing higher throughput of the system, which provides incremental gains in decreasing latency. Providing a higher throughput within the system can only be done, however, at the expense of cost and complexity. The bottom line is that as data rates and density of I/O ports are increased, the latencies of this system do not scale and in fact they are increased.

Figure 4:
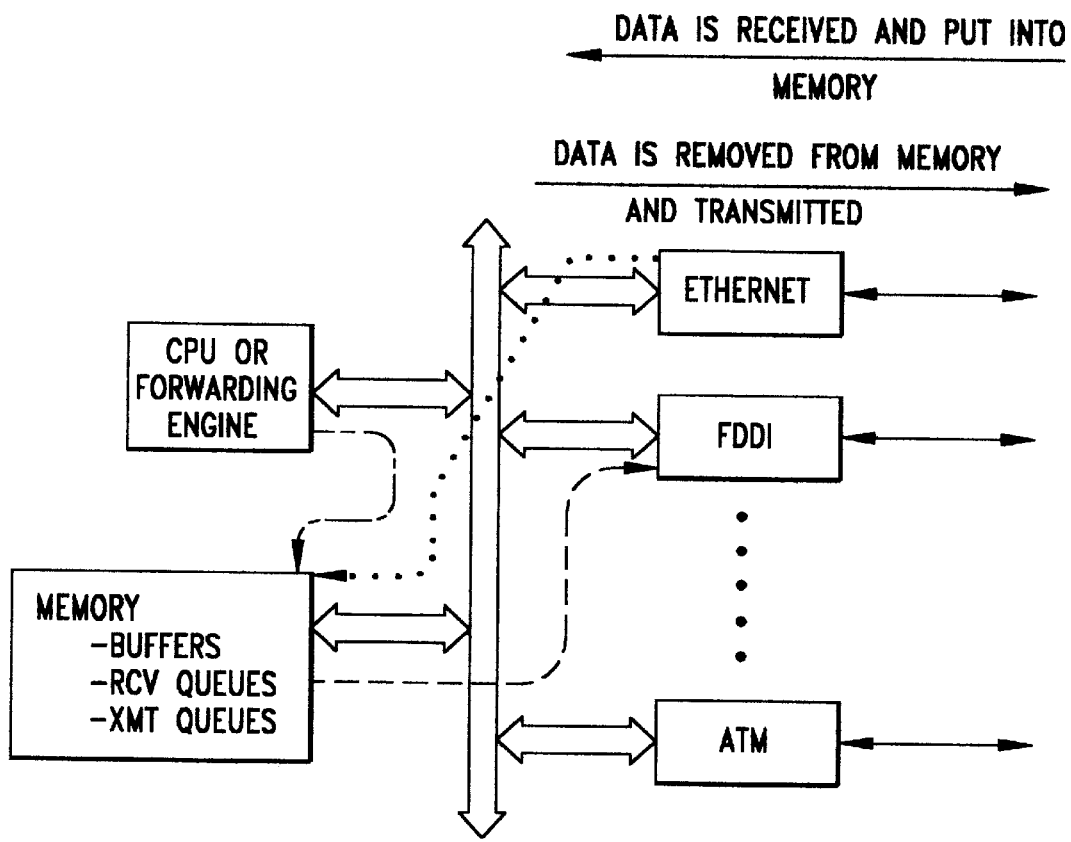
FIG. 4 illustrates a typical prior shared memory system with many I/O ports.

The Type of Networking of FIG. 4

Typical networking equipments such as switches, routers, bridges, hubs, routing switch, switching router, etc., interconnect multiple networks, such as ATM, Token Ring, FDDI, Ethernet, Sonet, etc. as shown in FIG. 4. Interconnecting these networks requires the CPU or Forwarding Engine (FE) to look at each packet or cell that the system receives and determine out of which port the packet/cell should be transmitted. As discussed earlier, the CPU/FE must access the beginning of each packet/cell to determine what type of data it is and where it is destined. As the data rates and I/O ports increase, so does the contention for the same memory resource, which increases the latency of the system, as before explained. The only solution to reduce the latency is to decrease the memory access time, but this results in higher costs and complexity. For shared memory systems, the performance of the memory system, at a minimum, has to be greater than two times the bandwidth of all the ports. For example, if a system had N ports and each port had a data rate of V, then the total bandwidth of the memory system has to be >2NV. It has to be greater than 2NV because the memory system must also support lookups and modifications of the control information as well as possible queue management, routing table lookups, etc. Since the memory system has to be >2NV, this inhibits its scalability in performance which results in limiting its scalability in reducing latency.

When providing QOS, which requires maintaining a lot of queues per port, this architecture results in increased latency due to increased contention to access the queues. This, of course, then requires higher memory throughput, which again increases the cost and complexity.

When providing multicast support, this also dramatically increases the number of accesses to the shared memory, increasing the contention and latency significantly, and requiring the memory system to be designed with an even higher throughput.

In this type of system, it is also impossible to achieve zero latency since the processing of the control information and queuing cannot begin until the packet/cell is completely written into memory.

Figure 5:
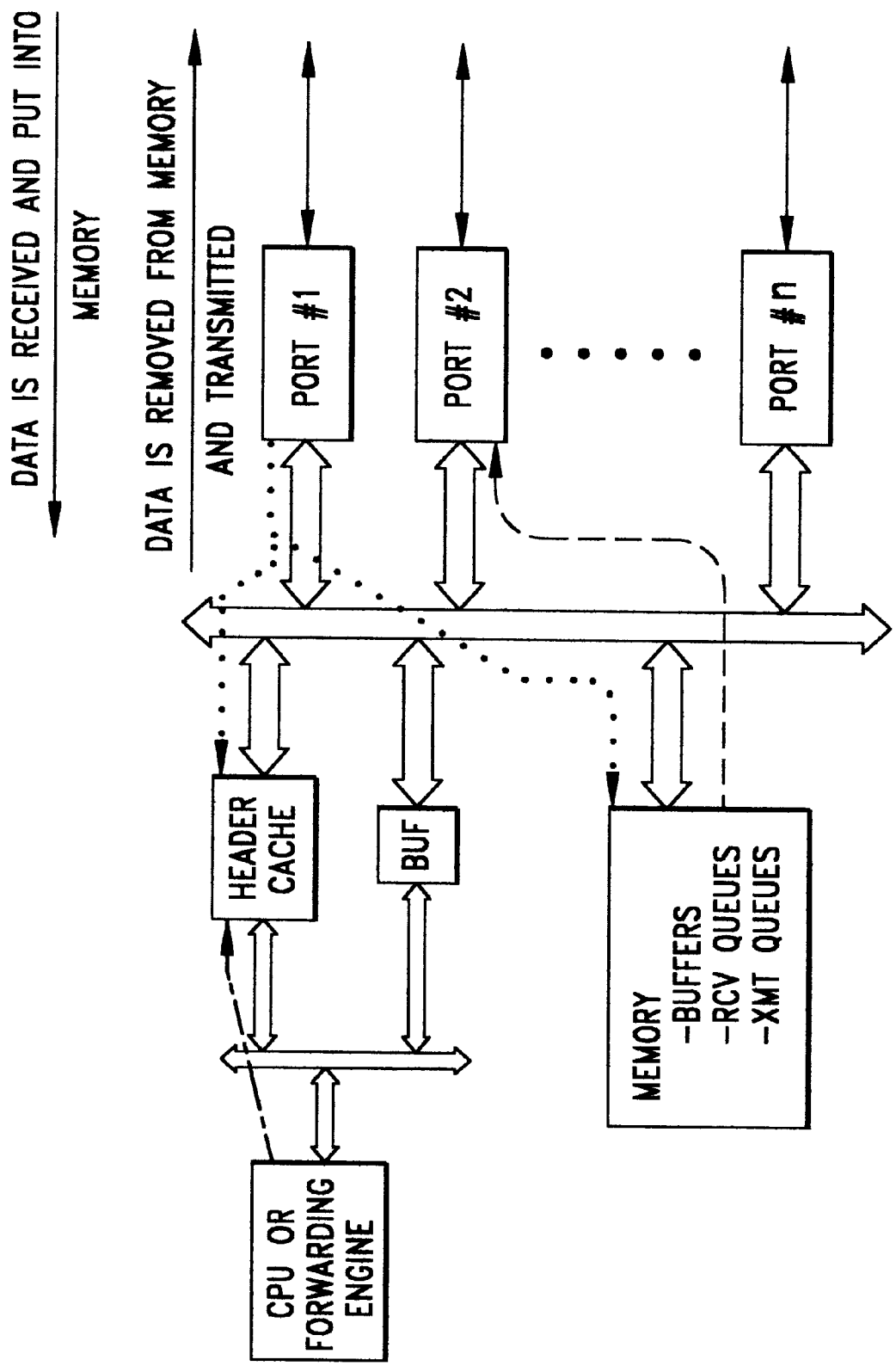
FIG. 5 illustrates a modified shared memory system with "header" cache.

The Type of Networking of FIG. 5

FIG. 5 is similar to FIG. 4 but adds a Header Cache in front of the CPU/FE. As packet/cells are transmitted/ received on each interface, they are read/written into the shared memory structure, but now the first 64 bytes of the packet are "mirrored" within the Header Cache. Since the first 64 bytes are copied into the Header Cache and a cell is 53 bytes, this architecture is only applicable to a packet-based system. When the CPU/FE accesses the control information of the packet, it actually retrieves the data from the Header Cache and not from the shared memory. This reduces contention to the shared memory but only for accesses to the control information. This architecture thus provides incremental improvement over the previous architecture example of FIG. 4.

As with the previous architecture, however, the memory system still needs to be greater than twice the throughput for each port. It is still a sequential set of accesses of writing data into the shared memory, processing the control information, setting up and maintaining the queues for each port and reading the data from the shared memory. As ports and data rates are increased, the memory throughput again needs to scale accordingly to provide the same latency. This can only be done by increasing cost and complexity which reaches a point where it is cost prohibitive to implement.

When providing QOS, which requires maintaining a lot of queues per port, this architecture results in increased latency due to increase contention to access the queues—again requiring higher memory throughput which increases the cost and complexity.

When providing multicast support, this also increases the number of accesses to the shared memory, increasing the contention and latency significantly and requiring the memory system to be designed with an even higher throughput.

In this system, also, it is impossible to achieve zero latency since the proessing of the control information and queuing again cannot begin until the packet/cell is completely written into memory.

Figure 6:
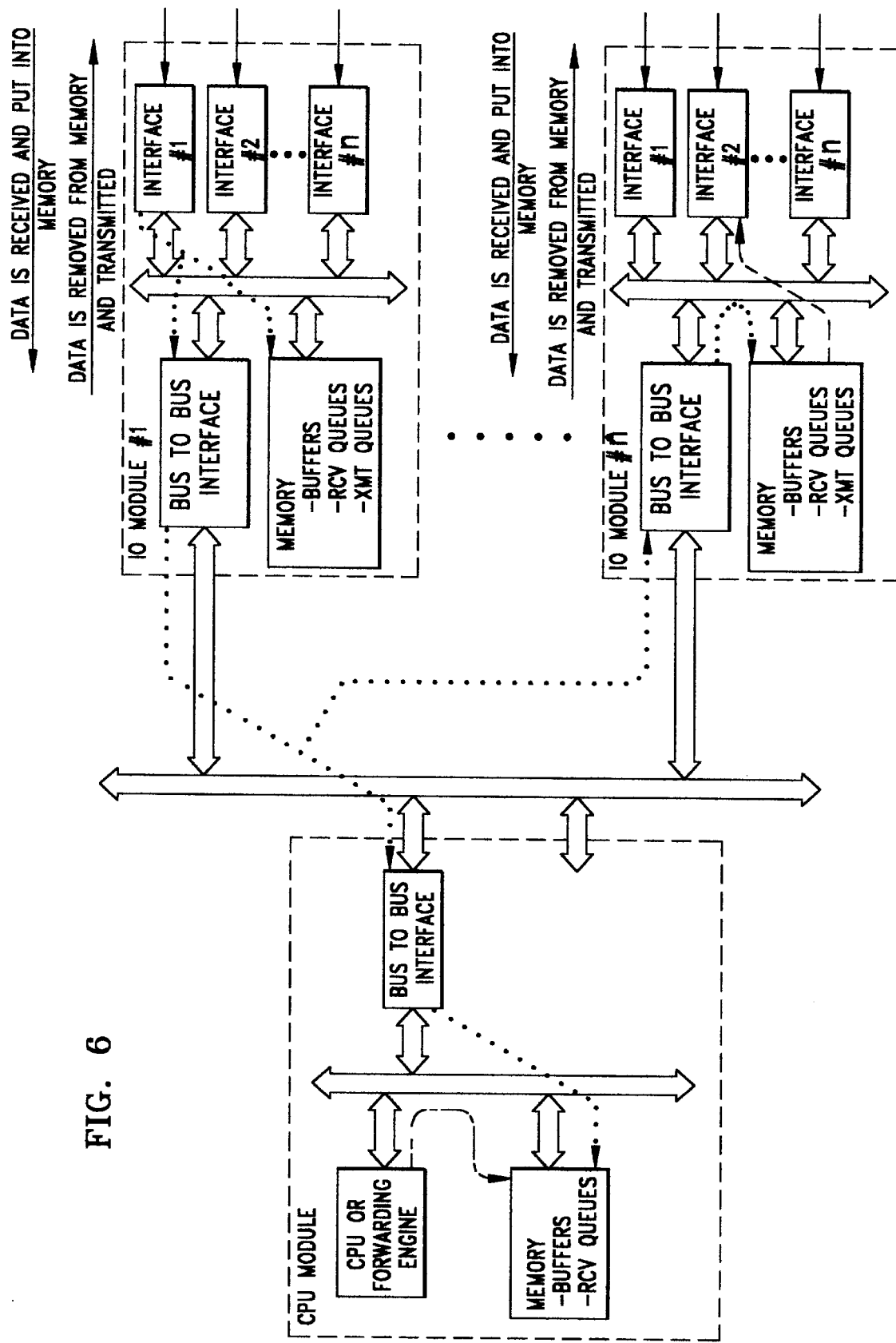
FIG. 6 is a similar diagram of typical distributed memory system in prior and current networking.

The Type of Networking FIG. 6

This system operates similarly to the system of FIG. 4. Within this system of FIG. 6, as packets/cells are received, they are stored within the memory on each I/O module as well as the CPU/FE memory. Once the data has been received in the memory accessible by the CPU/FE, it reads the control information to determine the port for which the data it is destined. Once determined, it will write to each I/O module to indicate whether it should either drop or keep the data. While this architecture therefore does alleviate some of the contention for accesses to the CPU/FE memory, thereby reducing some of the latency, it, in turn, generates a lot of contention in the main system bus since each I/O module has to transmit data for the other I/O module whether it needs it or not. As ports and data rates are increased, the memory throughput of the CPU/FE module has to be greater than the speed of all the ports in the system. While this reduces the cost and complexity of the memory system compared to the previous two examples of FIG. 4 and 5, it requires a more complex and costly "module" interconnection bus and memory on every I/O Module, which increases cost and complexity of the overall system. Another factor that increases cost and complexity is that every I/O Module has to have enough memory to be able to receive data from every other I/O module. Typically, the memory throughput on the I/O module only has to support twice the data rate of its port(s), as before explained, and the managing of its queues. In this architecture, it also has to support twice the data rate of its ports and the managing of its queues, and, in addition, the data rate of all the other ports within the system and the managing of additional receive queues for this data. As the ports and data rates are increased, the throughput of the memory system on every I/O Module and CPU/FE Module must be increased accordingly, limiting the scalability of this type of architecture.

When providing QOS, which requires maintaining a lot of queues per port, this architecture also results in increased latency due to increased contention to access the queues.

When providing multicast support, this architecture is better than the previous examples, in that the same packet can be transferred to each I/O Module simultaneously, but since the entire packet cannot be transferred in one access, the latency is increased accordingly. Thus, while this architecture does provide some incremental reduction in latency, it does so at the expense of higher memory throughput, and added cost and complexity per I/O module.

Once more, in this system, it is impossible to achieve zero latency since the processing of the control information and queuing cannot begin until the packet/cell is completely written into memory.

Figure 7:
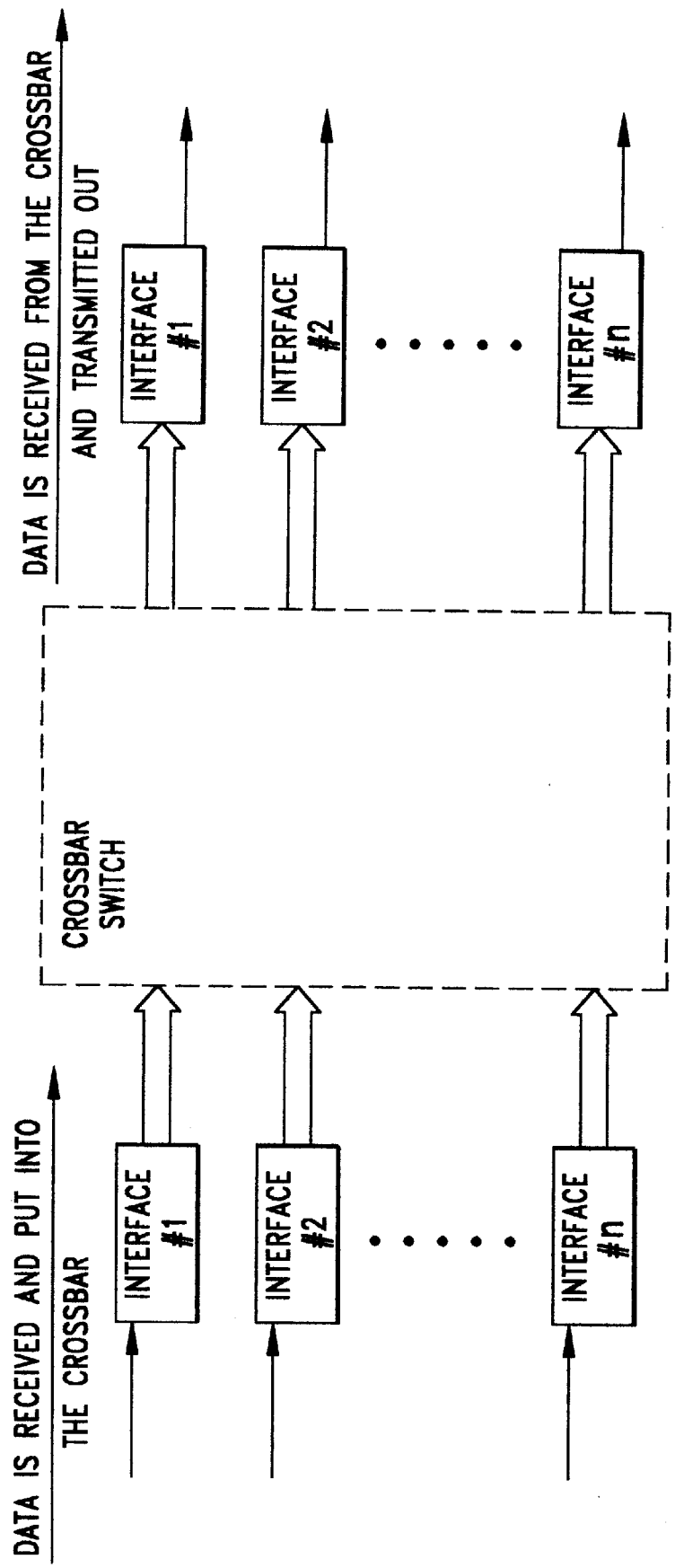
FIG. 7 shows a typical crossbar system for use in networking.

The Type of Networking FIG. 7

When using a crossbar as shown in FIG. 7, cells are typically processed at the input and given a new internal header that allows the cell to be switched efficiently within the crossbar. The crossbar will use the internal header to determine to which output port the cell should be switched. For multiple cells destined for the same output, it may require additional buffering either at the output, within the crossbar, or at the input. Most crossbar architectures are used with cells only, due to the fact that they typically have blocking problems due to several factors including multiple input ports destined for a single output port, and multicast. When packets are used, which can vary in size from 64 bytes to 64,000 bytes, these blocking issues become major problems and in general make the architecture unusable.

The initial lookup at the input port still has the contention problems discussed with FIG. 4, and must wait for the entire cell to be received before performing the lookup, again increasing the latency of the system. Once the cell enters the switch, the latency depends upon the type of crossbar that is implemented; but, in general, consists of transversing many hops in a silicon based crossbar or contending with shared memory in a memory based crossbar. Additional latency may occur if internal blocking occurs within the crossbar.

When providing QOS, queues are typically provided either at the input or output port. Since the queues are not required for every port, contention and the number of queues to maintain is reduced, which also reduces the latency.

When providing multicast support, cells are typically duplicated within the crossbar, resulting in blocking situations (and increased latency) internally or at the output port, and may also result in backpressure to the input port, which would require the input port to provide additional buffer space. As ports and data rates increase, this architecture does not scale because the multicast will grow the blocking problem and increase the cost and complexity of the system even more.

In this system, once more, it is impossible to achieve zero latency since again the processing of the control information and queuing cannot begin until the packet/cell is completely written into memory.

PREFERRED EMBODIMENT(S) OF THE INVENTION

Figure 8:
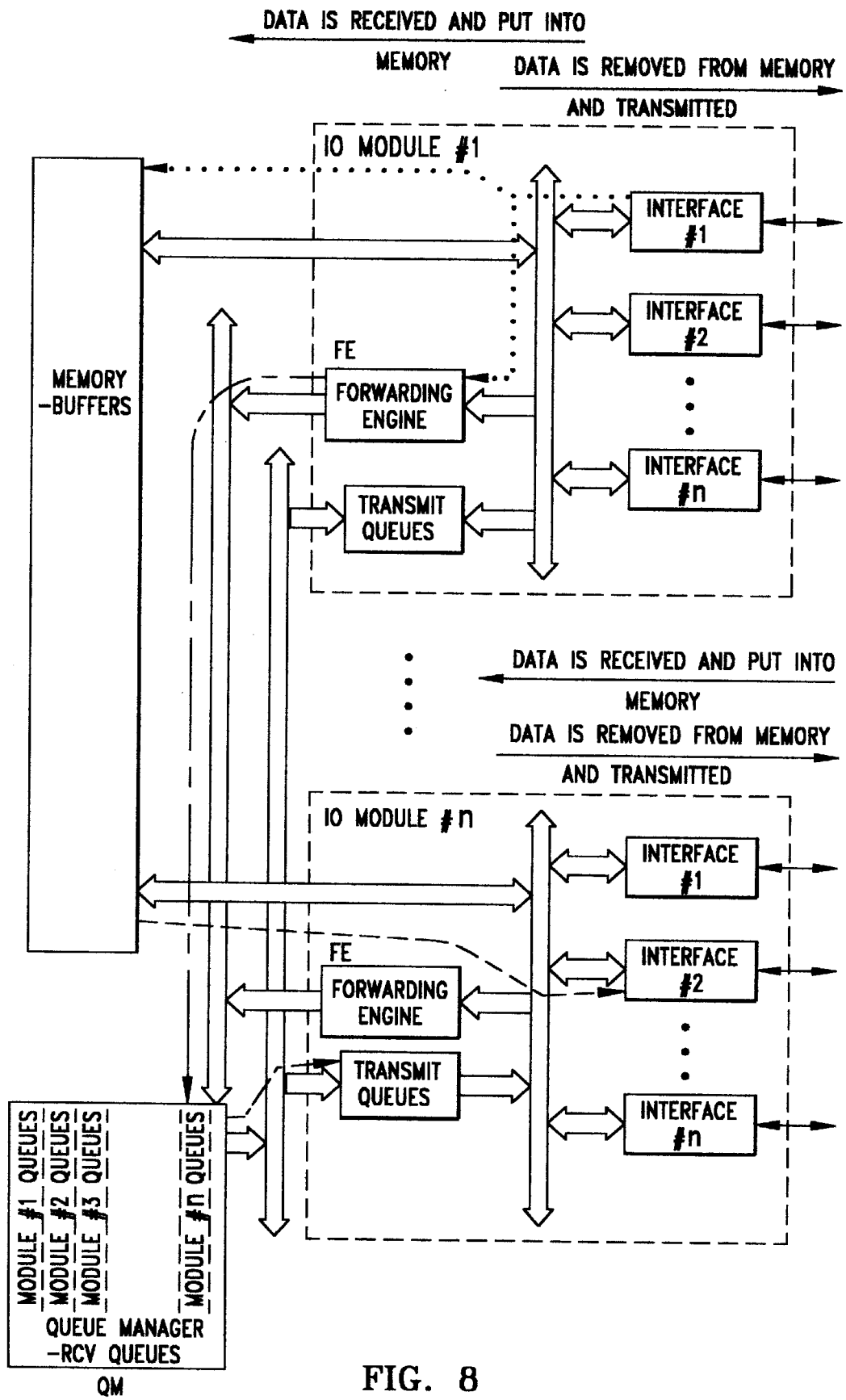
FIG. 8 is a diagram of the preferred Dual Path Data Processing and Management of Packets/Cells Architecture of this invention.

The present invention, exemplary illustrated in FIG. 8, and unlike all these prior systems, optimizes the networking system for minimal latency, and can indeed achieve zero latency even as data rates and port densities are increased. It achieves this equally well, moreover, for either 53 byte cells or 64 byte to 64K bytes packets. This is achieved by extracting the control information from the packet/cell as it is being written into memory, and providing the control information to a forwarding engine FE which will make switching, routing and/or filtering decisions as the data is being written into memory.

After the forwarding engine FE has completed its tasks, the results are then given to a queue manager QM for enqueuing and dequeuing these results. All this occurs, in accordance with the invention, before the packet/cell is completely written into memory, thereby allowing the read of the data to begin immediately after the packet/cell is completely written into memory. In fact, it is possible to start reading out the packet before it has been completely written into memory which could not heretofore be done when reading from memory, since incorrect data would be read from memory. A synchronization S between the ingress and egress port is required to guarantee that the read of the packet/cell does not begin too early, illustrated in FIG. 8, as achieved when the forwarding engine FE detects that the last data is in memory, and then passes queuing address information to the queue manager QM as to the intended egress port. This is an important distinction between the present invention and all other networking architectures. With such other architectures, this race condition does not exist, and therefore, as earlier pointed out, it is impossible to achieve zero latency with them.

To prevent the race condition, synchronization S between the ingress and egress ports is done at the output of the forwarding engine—the forwarding engine holding the results at its output until the packet/cell is completely written into memory, and then the forwarding engine can pass the results on to the queue manager as indicated by the dash-dot flow line.

A separate or dual path is thus used in this invention for the control information, allowing each I/O module (#1–#n) to process data only for its ports, whether it is transmit or receive data, and thereby requiring less complex logic, implementable more simply and cheaply than existing systems today. As noted earlier, most systems require the memory architectures that are used to store the control information to support much greater than twice the data rate of every port within the system. The present invention, on the other hand, reduces that requirement to the data rate of every port on its I/O Module—a significant reduction. It also allows the system to increase in ports and data rate without requiring costly and complex solutions.

In most other architectures, the FE and Queue Manager are required, as earlier shown, to access the same memory that is used to store the packet or cell, resulting in increasing latency since the FE and Queue Manager must contend with each port for memory accesses. With the present invention, however, the FE and Queue Manager have a separate path P to process the control information, thereby allowing these two entities to operate with maximum performance and without interference from the packet/cell transfers to/from memory. This has to occur, indeed, in order to achieve zero latency.

Figure 9:
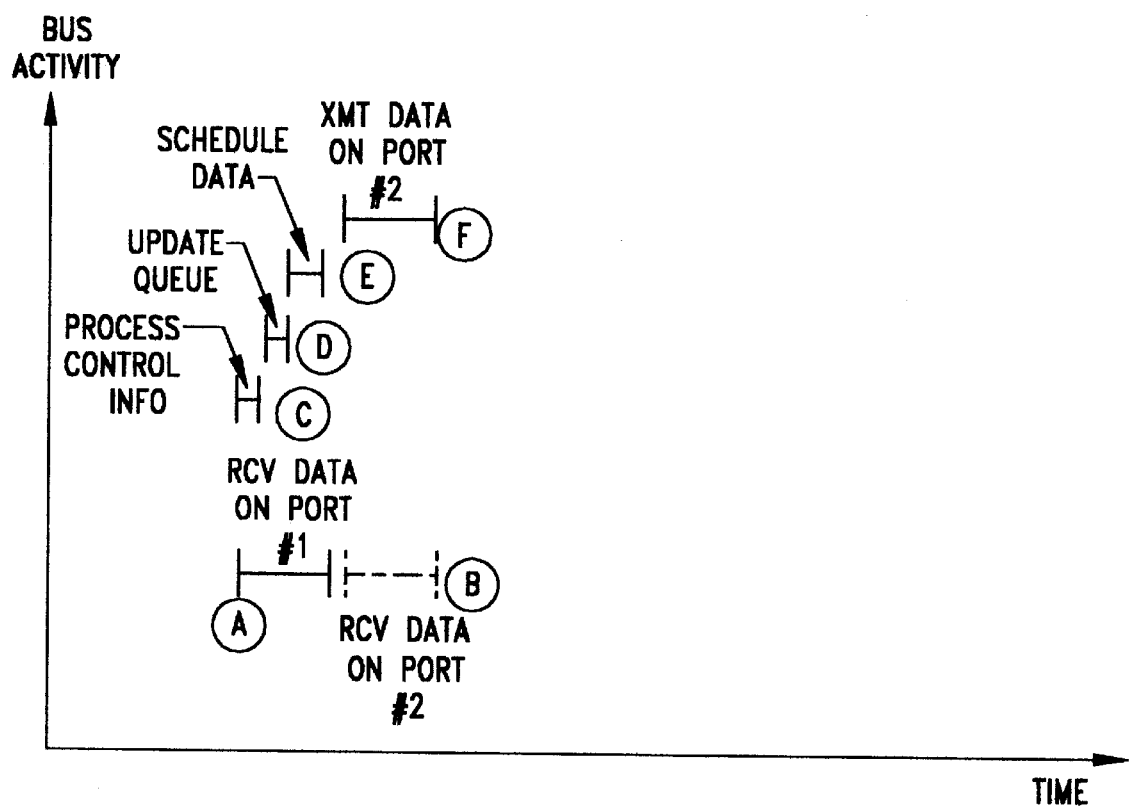
FIG. 9 is a diagram showing how latency is reduced in accordance with the invention.

As can be seen in FIG. 9, the latency of the system of the invention can be reduced to zero if the processing of the control information and queuing are done independently of writing the data into memory. In FIG. 9 (where again the access time per read or write to the memory is equal to M and the number of bits for a memory access is W), the following occurs with the dual path processing of the invention shown in FIG. 8, and as particularly contrasted from the A–E operations of FIG. 3, earlier presented:

A. Write of data from the receive port #1 to memory. The time to transfer a packet or cell is equal to $((B*8)/W)*M$, where B is equal to the number of bytes for the packet or cell. As the packet gets larger so does the time to write it to memory.

B. Write of data from the receive port #2 to memory. The time to transfer a packet or cell is equal to $((C*8)/W)*M$, where C is equal to the number of bytes for the packet or cell. As the packet gets larger so does the time to write it to memory.

C. The control information is extracted from the packet or cell as it is being written into memory. The processing of the control information begins immediately. The results from this processing are given to the queue manager. Since the control information is extracted from the header of the packet/cell, only the required information is extracted. This is typically 4 to 10 bytes for either packets or cells. The amount of time it takes to extract the control information depends upon the memory access time and width. The time to extract the control information is $((Y*8)/W)*M$, where Y is the number of bytes the control information spans within the header (typically, 4 to 24 bytes). As can be seen, since the Forwarding Engine does not have to contend with any other devices, and there are no delays in beginning to process the control information. This results in not impacting the latency of the packet/cell just received.

D. Pass the buffer address of packet/cell just received from port #1 to the appropriate egress I/O Module. On the I/O Module, the Queue Manager puts the buffer address on the appropriate queue and will extract it when it appears at the top of the queue. The forwarding results are typically 4 to 10 bytes. The time to pass the results to the Queue Manager is $((Z*8)/R)*S$, where Z is the length of the forwarding results, R is the width of the bus used to send the results from the FE to the Queue Manager, and S is the clock rate of the same bus. As can be seen, the transfer of packets/cells into/from memory will not interfere with passing the forwarding results. This results in not impacting the latency of the packet/cell just received.

E. This is reading the different queues to determine which queues have data that is available to be transmitted. This consists of reading multiple queues until the buffer address of the packet/cell from port #1 is ready to be transmitted. Each queue entry read is typically, 8 to 12 bytes. The time to update the queue is (F+1)(((P*8)/R)*S), where F is the number of queues read before the packet is finally dequeued. The queues are distributed, and the number of queues to read is reduced to the number of queues to support that particular I/O Module (and not the total system). This reduces the amount of time required to scan the different queues, thus assisting in achieving zero latency. As can be seen, the transfer of packets/cells into/from memory will not interfere with the dequeuing of the buffer address. This results in not impacting the latency of the packet/cell just received.

F. Read of data from the memory to receive port #2. The time to transfer a packet or cell is equal to ((B*8)/W)*M, where B is equal to the number of bytes for the packet or cell. As the packet gets larger so does the time to read it from memory.

When providing QOS, which, as before explained, requires maintaining a lot of queues per port, this architecture allows for the Queue Manager to be split into N independent sub-Queue Managers, where each sub-Queue Manger is responsible for processing the queues for its associated I/O module. This allows a simpler and cheaper implementation that can scale as the ports and the data rate of the system are increased, again allowing the system to achieve zero latency.

When providing multicast support, this architecture of the invention provides the optimal solution in that it passes the minimal amount of information required to make forwarding and queuing decisions such that simple and inexpensive implementations can be used. Since the Queue Manager consists of "sub-Queue" Managers, the multicast information can be given to each sub-Queue manager at the same time, thereby eliminating contention and achieving zero latency.

The present invention thus provides for the optimal solution for minimizing latency, and a solution that scales with an increase of ports and data rates, while only requiring simple and inexpensive implementations.

The end result of the invention is that the forwarding engine does not have to contend with other resources while processing the control information of each packet/cell; in fact, since it only has to process the data within its I/O Module, it can be simpler and less complex. The Queue Manager also does not have to contend with other resources while processing the receive and transmit queues of each packet/cell; in fact, since it only has to process the data within its I/O Module, it can also be simpler and less complex.

With the invention, furthermore, there is no contention between the data and the control information, and, queues are handled efficiently as well as providing multicast support. The end result is an architecture that dramatically reduces latency. When combined with the bandwidth optimizing structure of said co-pending application, networks of optimum bandwidth and minimum latency are attained.

Further modifications will occur to those skilled in this art, and such are considered to fall within the spirit and scope of the invention as defined in the appended claims.

What is claimed is:

1. In a CPU or similar data controller system wherein data is interfaced along a common bus connected with common memory and with a plurality of I/O modules receiving and writing into the memory and removing therefrom packets/cells of data, a method of reducing memory and bus access contention and resulting system latency, that comprises, providing each I/O module with a corresponding forwarding engine and transmit queue facility and a separate path for extracting control information from the packet/cell received by that I/O module and providing that control information to the forwarding engine; processing the extracted packet/cell control information in the forwarding engine for making switching, routing and/or filtering decisions while the data thereof is being written into the memory; passing the results of the forwarding engine processing to a queue manager for enqueuing and dequeuing receive and transmit queues of each packet/cell, and controlling, through the corresponding I/O module transmit queue facility, the interfacing with the appropriate egress I/O module to which to transmit the packet/cell data, all without contention with and independent of the transfer of packet/cell data into and from the memory.

2. A method as claimed in claim 1 and in which the control information is extracted from a header of the packet/cell, and buffer address information thereof is processed by the queue manager.

3. A method as claimed in claim 2 and in which the forwarding engine results are passed to the queue manager before the packet/cell data is completely written into the memory, thereby allowing the reading out of the data to begin immediately after the packet/cell data is completely written into the memory.

4. A method as claimed in claim 2 and in which the starting of the reading out of the packet/cell data commences before it has been completely written into the memory.

5. A method as claimed in claim 4 and in which synchronization between data ingress and egress is effected to insure that the reading out of the packet/cell does not begin too early.

6. A method as claimed in claim 5 and in which the forwarding engine passes its said results to the queue manager upon the detection that all the packet/cell data has been written into the memory.

7. A method as claimed in claim 2 and in which the buffer address of the received packet/cell is passed to the appropriate egress I/O module.

8. A method as claimed in claim 7 and in which the queues are distributed, with the number of queues read by the queue manager reduced to that number of queues required to support the particular I/O module and not the total system.

9. A method as claimed in claim 7 and in which multiple queues are maintained for each I/O port and the queue manager is divided into a plurality of independent sub-queue managers each processing the queues of its associated I/O module.

10. A method as claimed in claim 9 and in which multicast information is supplied to each sub-queue manager at the same time.

11. Apparatus for reducing memory and bus access contention and resulting system latency in CPU or similar data controller systems wherein data is interfaced along a common bus connected with common memory and with a plurality of I/O modules receiving and writing into the memory and removing therefrom packets/cells of data, said apparatus having in combination, a plurality of forwarding engines and transmit queue facilities, one provided in each I/O module, together with a separate path for extracting control information from the packet/cell received by their I/O module and for providing that control information to the forwarding engine thereof; each forwarding engine processing the extracted control information from the packet/cell received by its corresponding I/O module for making switching, routing and/or filtering decisions while the data thereof is being written into the memory; means for passing the results of the forwarding engine processing to a queue manager for enqueuing and dequeuing receive and transmit queues of each packet/cell and controlling, through the corresponding I/O module transmit queue facility, the interfacing with the appropriate egress I/O module to which to transmit the packet/cell data, all without contention with and independent of the transfer of packet/cell data into and from the memory.

12. Apparatus as claimed in claim 11 wherein the control information is extracted from a header of the packet/cell data.

13. Apparatus as claimed in claim 12 wherein the forwarding engine provides buffer address information to the queue manager.

14. Apparatus as claimed in claim 13 wherein means is provided for passing the forwarding engine results to the queue manager before the packet/cell data is completely written into the memory, thereby allowing the reading out of the data to begin immediately after the packet/cell data is completely written into the memory.

15. Apparatus as claimed in claim 13 wherein means is provided for starting the reading out of the packet/cell data before it has been completely written into the memory.

16. Apparatus as claimed in claim 15 wherein means is provided for synchronizing data ingress and egress to insure that the reading out of the packet/cell does not begin too early.

17. Apparatus as claimed in claim 16 wherein means is provided for the forwarding engine to pass its said results to the queue manager upon the determination that the last bit of the packet/cell data has been written into the memory.

18. Apparatus as claimed in claim 13 wherein the buffer address of the received packet/cell is passed to the appropriate egress I/O module.

19. Apparatus as claimed in claim 18 and in which the queues are distributed, with the number of queues read by the queue manager reduced to that number of queues required to support the particular I/O module and not the total system.

20. Apparatus as claimed in claim 18 and in which multiple queues are maintained for each I/O port and the queue manager is divided into a plurality of independent sub-queue managers each processing the queues of its associated I/O module.

* * * * *